(12) United States Patent
Asamizu et al.

(10) Patent No.: US 10,481,430 B2
(45) Date of Patent: Nov. 19, 2019

(54) DISPLAY DEVICE

(71) Applicant: Sakai Display Products Corporation, Osaka (JP)

(72) Inventors: Tomohiro Asamizu, Sakai (JP); Daisuke Teragawa, Sakai (JP); Noriaki Miyoshi, Sakai (JP)

(73) Assignee: Sakai Display Products Corporation, Osaka (JP)

( * ) Notice: Subject to any disclaimer, the term of this patent is extended or adjusted under 35 U.S.C. 154(b) by 0 days.

(21) Appl. No.: 16/063,074

(22) PCT Filed: Dec. 17, 2015

(86) PCT No.: PCT/JP2015/085420
§ 371 (c)(1),
(2) Date: Aug. 24, 2018

(87) PCT Pub. No.: WO2017/104058
PCT Pub. Date: Jun. 22, 2017

(65) Prior Publication Data
US 2019/0025654 A1    Jan. 24, 2019

(51) Int. Cl.
*G09F 13/04* (2006.01)
*G02F 1/1335* (2006.01)
*G02F 1/1333* (2006.01)

(52) U.S. Cl.
CPC ...... *G02F 1/133608* (2013.01); *G02F 1/1333* (2013.01); *G02F 1/133308* (2013.01); *G02F 1/133603* (2013.01); *G02F 1/133606* (2013.01); *G02F 2001/13332* (2013.01); *G02F 2001/133314* (2013.01)

(58) Field of Classification Search
None
See application file for complete search history.

(56) References Cited

U.S. PATENT DOCUMENTS

2012/0257417 A1    10/2012    Lee et al.

FOREIGN PATENT DOCUMENTS

| JP | 2002-169479 A | 6/2002 |
|----|---------------|--------|
| JP | 2013-246439 A | 12/2013 |
| WO | 2013/035601 A1 | 3/2013 |
| WO | 2015/186765 A1 | 12/2015 |

OTHER PUBLICATIONS

International Search Report issued in PCT/JP2015/085420; dated Mar. 8, 2016.

*Primary Examiner* — Vip Patel
(74) *Attorney, Agent, or Firm* — Studebaker & Brackett PC

(57) ABSTRACT

Provided is a display device that makes it possible to enhance the uniformity of brightness distribution with a display surface. The display device is provided with: a display panel having one surface on which an image is displayed; a substrate that is arranged facing the other surface of the display panel and that has a plurality of light sources mounted thereon; a rectangular diffuser plate arranged between the display panel and the substrate; and two support members that comprises an opening through which light from the light sources passes and that support the diffuser plate by sandwiching the peripheral edge of the diffuser plate from the display panel side and the substrate side. Light-transmitting sections through which light that has passed through the diffuser plate passes are provided to the four corners of the support member on the display panel side.

18 Claims, 11 Drawing Sheets

DISPLAY DEVICE

TECHNICAL FIELD

The present invention relates to a display apparatus with a direct backlight module.

BACKGROUND ART

Recently, display apparatuses each including a liquid crystal panel as an image display section are widely used. The display apparatuses each include a backlight module at the back side of the liquid crystal panel.

Various designs are employed for arrangement of the backlight module. One example of employed backlight module arrangement is a direct arrangement of the backlight module in which a light source is located at a position opposed to the entirety of the back surface of the liquid crystal panel. For example, Patent Literature 1 discloses a backlight device in which a hollow cylindrical light source and a reflection body are disposed in a flat casing with an opening at an upper end thereof and a light transmission-diffusion body is disposed at the opening of the casing.

A display apparatus including a backlight device such as above displays an image on a front surface of the liquid crystal panel in a manner that light from the light source is diffused by the light transmission-diffusion body and the diffused light is allowed to pass through the liquid crystal panel while being modulated by the liquid crystal panel.

CITATION LIST

Patent Literature

[Patent Literature 1]
Japanese Patent Application Laid-Open Publication No. 2002-169479

SUMMARY OF INVENTION

Technical Problem

In Patent Literature 1 described above, the reflection body, which includes a bottom surface and a side surface having different reflection properties, is disposed on an inner surface of the casing to even out light quantities at a part of a light irradiated surface having low luminance with at a part thereof having high luminance, thereby reducing unevenness in luminance.

However, in the backlight device disclosed in Patent Literature 1, light reflected by the side surface of the casing is lead to an inward region of the light irradiated surface with a result that sufficient luminance cannot be obtained at four corners of the light irradiated surface.

The present invention has been made in view of the forgoing and has its object of providing a display apparatus in which degree of evenness of luminance distribution over a display surface is increased.

Solution to Problem

A display apparatus according to an embodiment of the present application includes a display panel, a substrate, a diffusion plate, and two support members. The display panel has one surface on which an image is displayed. The substrate faces another surface of the display panel that is opposite to the one surface. A plurality of light sources are mounted on the substrate. The diffusion plate has a substantially rectangular shape and is disposed between the display panel and the substrate. The two support members each have an opening through which light from the light sources passes, and support the diffusion plate in a manner to hold a peripheral part of the diffusion plate from a display panel side and a substrate side. A light passing portion through which light having passed through the diffusion plate is allowed to pass is provided at each of four corners of one support member of the two support members that is located at the display panel side.

Advantageous Effects of Invention

According to an embodiment of the present application, degree of evenness of luminance distribution over the display surface can be increased.

DESCRIPTION OF EMBODIMENTS

The present invention will be described below with reference to drawings that illustrate embodiments thereof.

First Embodiment

Figure 1:
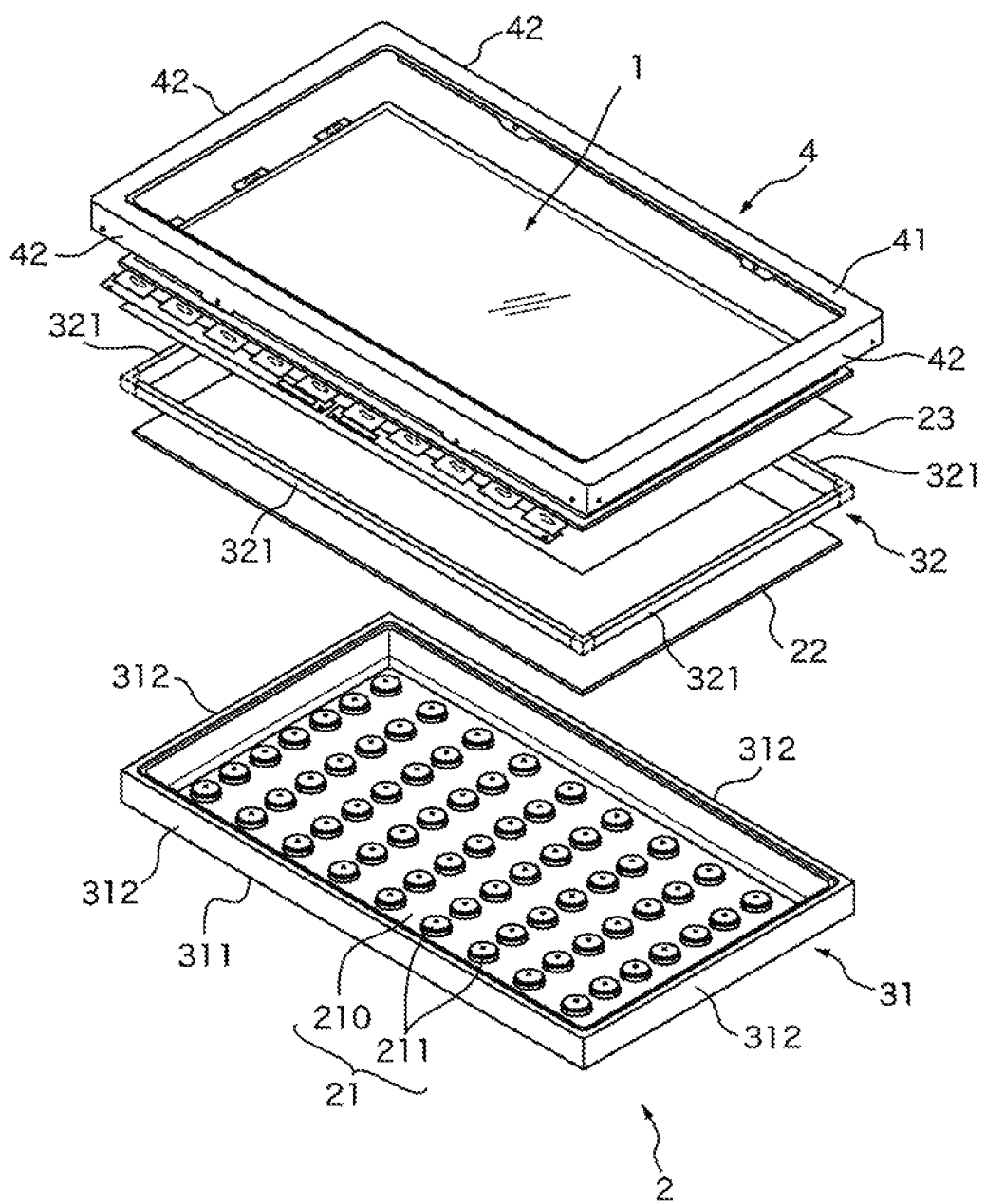
FIG. 1 is an exploded perspective view of a display apparatus according to a first embodiment.
Figure 2:
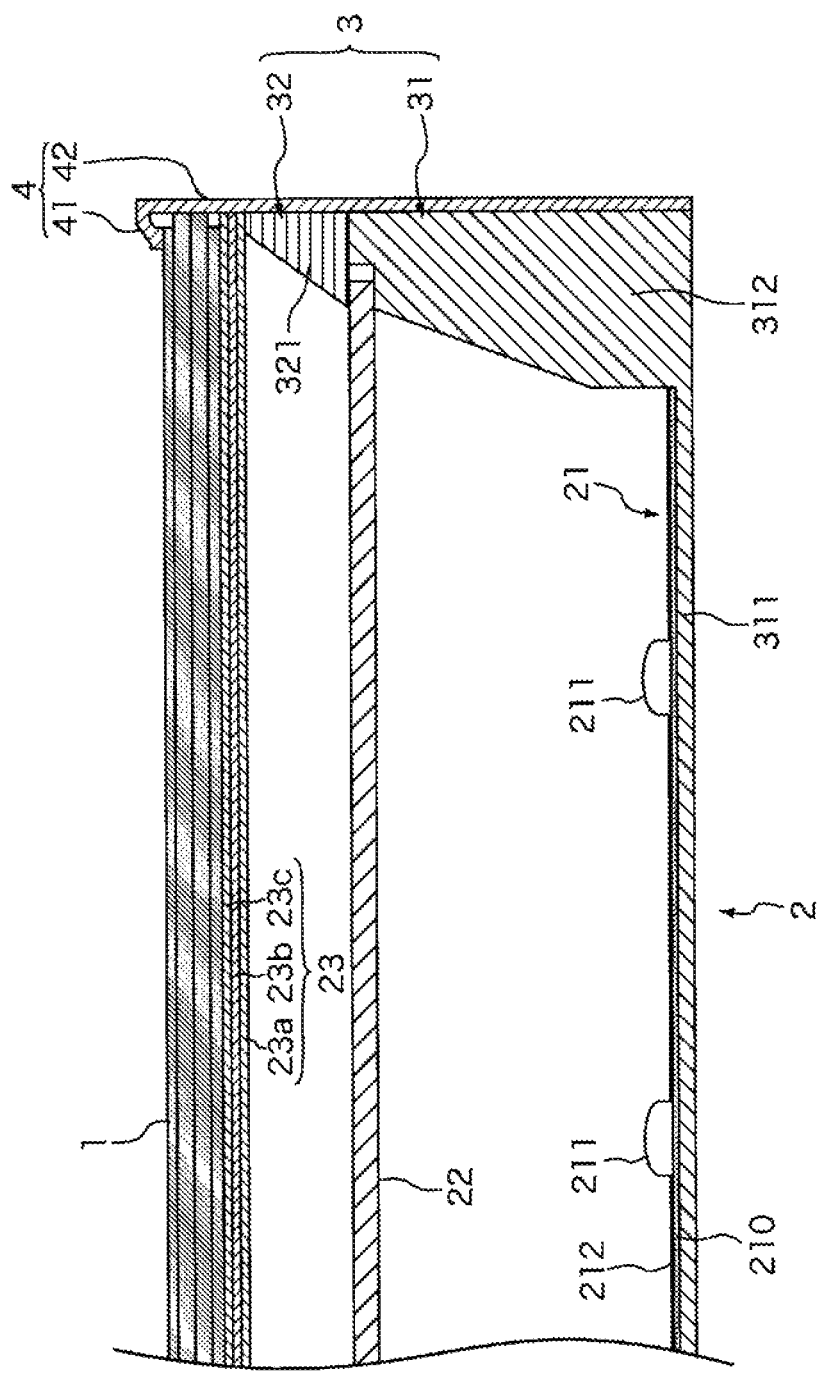
FIG. 2 is a vertical cross-sectional view of the display apparatus according to the first embodiment.

FIG. 1 is an exploded perspective view of a display apparatus according to a first embodiment. FIG. 2 is a vertical cross-sectional view of the display apparatus according to the first embodiment. The display apparatus according to the present embodiment is a liquid crystal display apparatus for example including a liquid crystal panel 1 at a front side of the display apparatus and a light source section 2 at a back side thereof.

The liquid crystal panel 1 is a rectangular display panel including a plurality of liquid crystal display elements arranged in a matrix for displaying an image on a front surface of the liquid crystal panel 1.

The light source section 2 is a direct backlight module that emits light from the back side of the liquid crystal panel 1. The light source section 2 includes a light emitting diode (LED) substrate 21, a diffusion plate 22, and an optical sheet 23, and irradiates the liquid crystal panel 1 with light emitted from light sources (LED chips 221) on the LED substrate 21 through the diffusion plate 22 and the optical sheet 23.

The LED substrate 21 includes a rectangular substrate 210 and the plurality of LED chips 211, 211, ..., 211 mounted on the substrate 210 at substantially regular intervals in a longitudinal direction and a short direction of the substrate 210. The LED chips 211 each are for example a package including a light emitting diode element, a phosphor covering the light emitting diode element, and an accommodation body that accommodates them. Note that the LED substrate 21 has a surface on which a reflection sheet 212 having high reflectivity is disposed. The reflection sheet 212 is preferably formed of a reflection body for example having a light reflectivity of at least 85%. Alternatively, the surface of the substrate 210 may be coated with white paint.

The diffusion plate 22 is a rectangular plate body made of a synthetic resin having high transparency, such as an acrylic resin or a polycarbonate resin and having a specific thickness. The diffusion plate 22 includes a plurality of diffusion particles dispersed therein, and has a function of diffusing light passing through the diffusion plate 22. That is, light of the LED chips 211 entering the diffusion plate 22 from one surface thereof is diffused by the diffusion particles therein when traveling in a thickness direction of the diffusion plate 22. Part of the diffused light passes through another surface of the diffusion plate 22, while the other part thereof is reflected toward the one surface thereof.

The optical sheet 23 is a transparent sheet having a specific optical property, and is formed of a lamination body of a plurality of sheets. The optical sheet 23 in the present embodiment is formed of a lamination body of a diffusion sheet 23a, a lens sheet 23b, and a reflective polarizing sheet 23c. Note that the number of sheets and the configuration of the sheets constituting the optical sheet 23 can be altered as appropriate according to required specification such as luminance or optical property.

The display apparatus includes a panel chassis 3 that accommodates the LED substrate 21. The panel chassis 3 in the present embodiment includes a backside panel chassis 31 that is a shallow bottomed casing and a frontside panel chassis 32 that is a frame-shaped frame body with an opening at a central part thereof.

The backside panel chassis 31 includes a rectangular bottom surface portion 311 and side walls 312. The LED substrate 21 on which the LED chips 211 are mounted is attached to the bottom surface portion 311. The side walls 312 stand upright from the peripheral edge of the bottom surface portion 311. The backside panel chassis 31 is made of for example a metal excellent in thermal conductivity, such as aluminum for radiating heat emitted from the LED chips 211. The side walls 312 each have an inclined surface that is an inner circumferential surface that is inclined obliquely outward between the bottom surface portion 311 and the diffusion plate 22 (i.e., a tapered inclined surface of each side wall 312 of which thickness gradually decreases in a height direction thereof). The side walls 312 reflect incident light toward the front side of the display apparatus. In this connection, the inclined surfaces of the side walls 312 are preferably formed of a reflection body for example having a reflectivity of at least 85%. Alternatively, a reflection sheet having high reflectivity may be provided on or near the inclined surface or white paint may be applied onto a reflection surface.

The frontside panel chassis 32 is a frame-shaped frame body with an opening at a central part thereof. The frontside panel chassis 32 includes four circumferential walls 321. The frontside panel chassis 32 and the backside panel chassis 31 hold the peripheral part of the diffusion plate 22 therebetween to support the diffusion plate 22. The circumferential walls 321 each have an inclined surface that is an inner circumferential surface inclining obliquely outward between the diffusion plate 22 and the optical sheet 23 (i.e., a tapered inclined surface of each circumferential wall 321 of which thickness gradually decreases in a height direction thereof), and reflect incident light toward the front side of the display apparatus. In this connection, the inclined surfaces of the circumferential walls 321 are each preferably made of a reflection body for example having a reflectivity of at least 85%. Alternatively, a reflection sheet having high reflectivity may be provided on or near each inclined surface of the circumferential walls 321 or white paint may be applied onto reflection surfaces.

The display apparatus further includes a frame-shaped bezel 4 that covers the peripheral part of the liquid crystal panel 1 from the front of the display apparatus. The bezel 4 is a frame body slightly larger than the panel chassis 3, and has an opening at a central part thereof. The bezel 4 includes a frame portion 41 that covers the peripheral part of the liquid crystal panel 1 from the front of the liquid crystal panel 1 and side walls 42 that cover the outer circumferential surfaces of the panel chassis 3. When the bezel 4 is set in a state in which the diffusion plate 22 is held between the backside panel chassis 31 and the frontside panel chassis 32 and the optical sheet 23 and the liquid crystal panel 1 are placed on the frontside panel chassis 32, the frame portion 41 is in contact at the inner circumferential surface thereof with the peripheral part of the liquid crystal panel 1 located at the front side thereof while the side walls 42 are in contact at the inner circumferential surfaces thereof with the respective outer circumferential surfaces of the backside panel chassis 31 and the frontside panel chassis 32. Thus, the liquid crystal panel 1 is supported together with the optical sheet 23 in a manner to be held between the frontside panel chassis 32 and the frame portion 41 of the bezel 4.

The display apparatus according to the present embodiment is configured as above. The display apparatus performs image display in a manner that light is irradiated from the back of the liquid crystal panel 1 using the light source section 2 and light transmittance of each liquid crystal display element (pixels) arranged in the liquid crystal panel 1 is adjusted by driving and controlling the liquid crystal display elements by a non-illustrated drive circuit.

Figure 3:
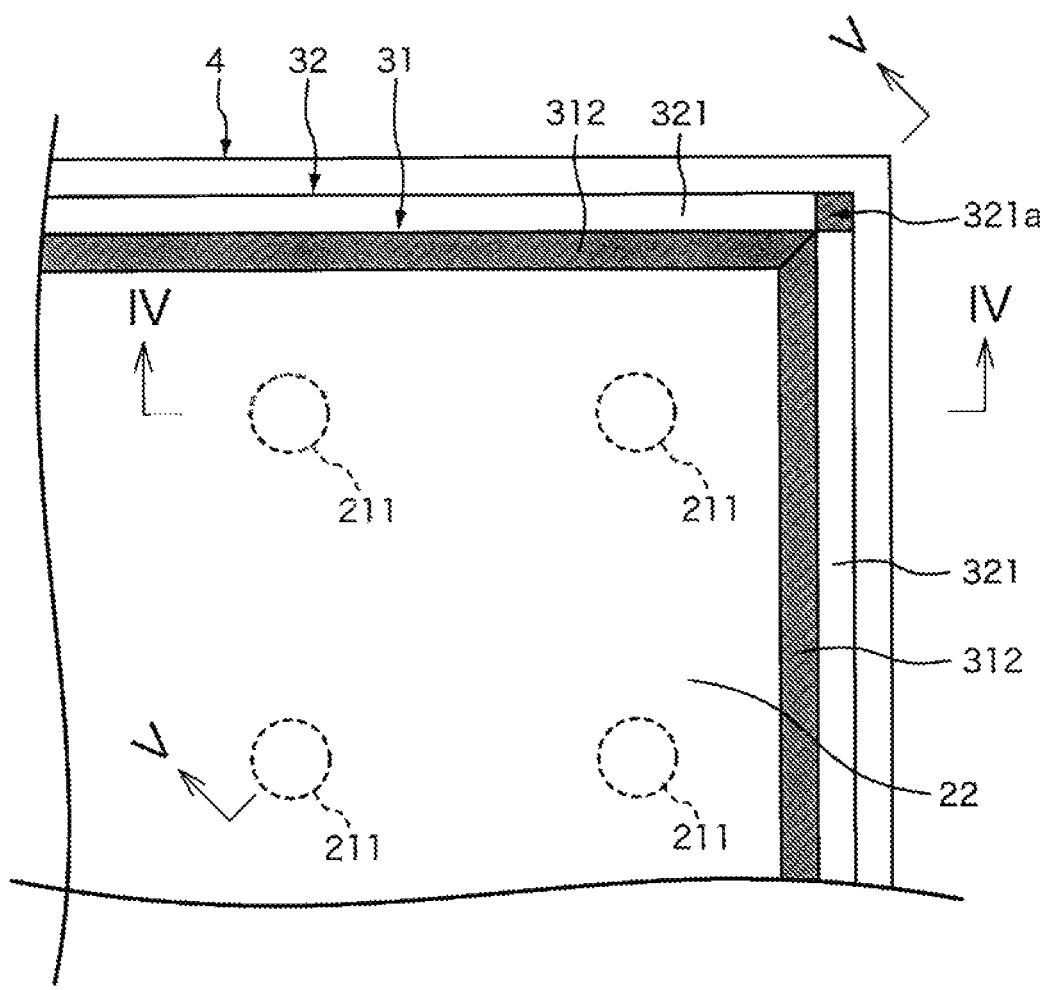
FIG. 3 is a partial front view of the display apparatus according to the first embodiment.
Figure 4:
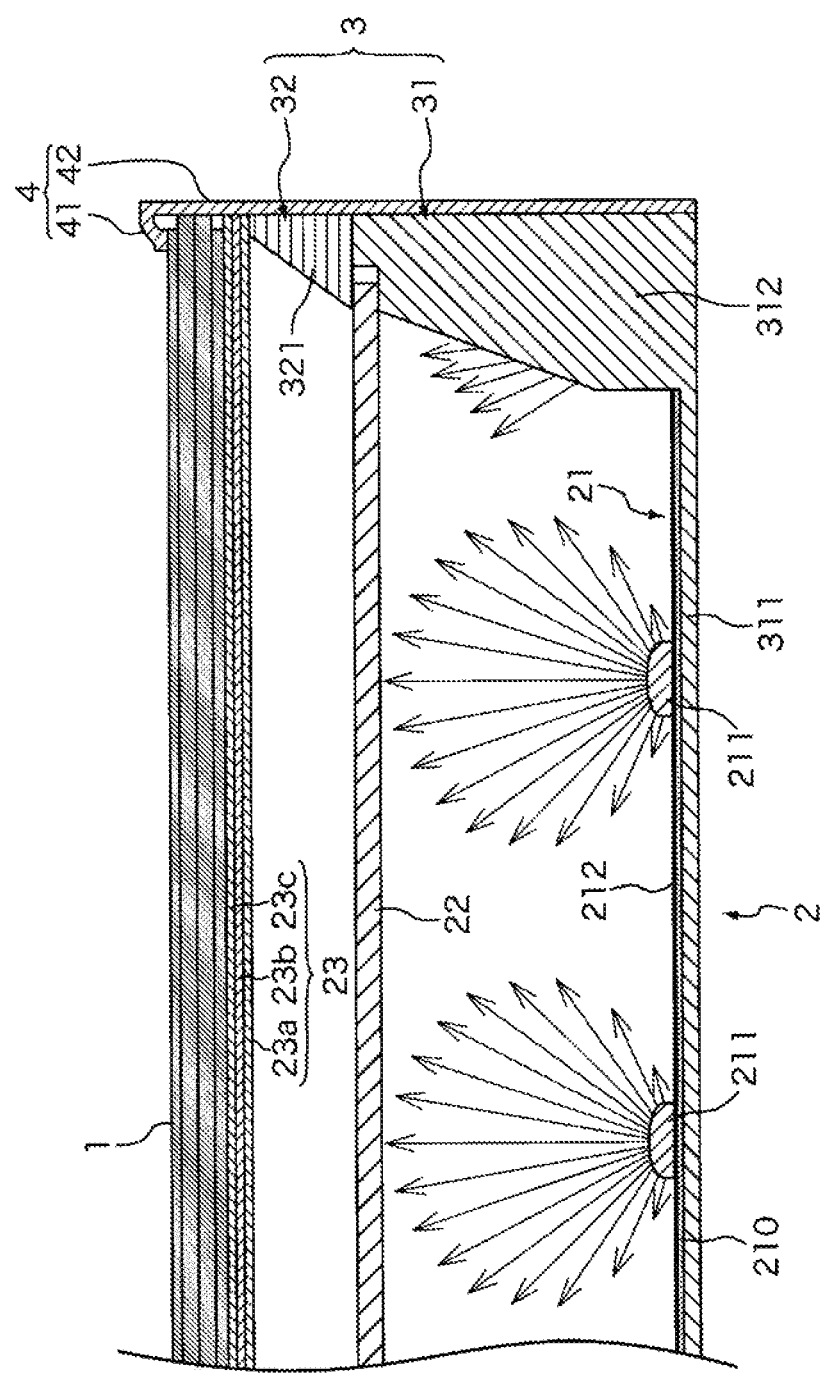
FIG. 4 is a cross-sectional view taken along a line IV-IV in FIG. 3.
Figure 5:
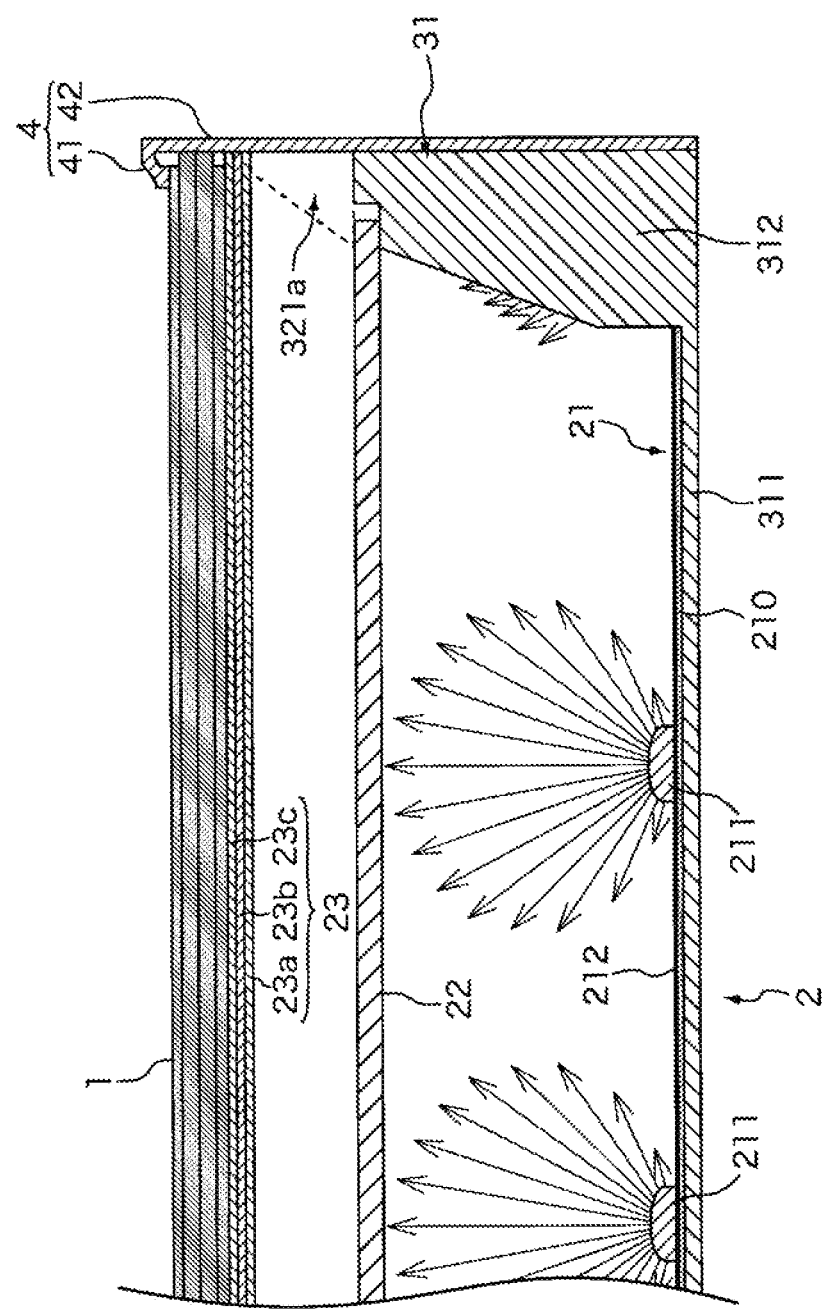
FIG. 5 is a cross-sectional view taken along a line V-V in FIG. 3.

FIG. 3 is a partial front view of the display apparatus according to the first embodiment. FIG. 4 is a cross-sectional view taken along a line IV-IV in FIG. 3. FIG. 5 is a cross-sectional view taken along a line V-V in FIG. 3. Note that the liquid crystal panel 1 and the optical sheet 23 are omitted and a region indicating the backside panel chassis 31 is grayed in the partial front view of FIG. 3 in order to clarify a positional relationship between the backside panel chassis 31 and the frontside panel chassis 32.

Vents 321a are provided in the present embodiment that are parts of respective four corners of the frontside panel chassis 32 that are removed. The vents 321a each serve as a light passing portion through which light having passed through the diffusion plate 22 is allowed to pass toward a corresponding one of the four corners of the liquid crystal panel 1. In the example illustrated in FIG. 3, one of the vents 321a that are removed parts at the respective four corners of the frontside panel chassis 32 is illustrated. The illustrated vent 321a is in a tetragonal shape when viewed from the front having a size substantially equal to the thickness of each circumferential wall 321 at the bottom of the circumferential wall 321.

The diffusion plate 22, which diffuses light from the LED chips 211, 211, . . . , 211 using the diffusion particles therein when light passes through the diffusion plate 22, has a function of evening out luminance distribution of light passing toward the liquid crystal panel 1 over the surface of the diffusion plate 22. Conventionally, the distance from light sources such as LEDs to a panel chassis is longer in an oblique direction than a vertical direction or a horizontal direction. As a result, a light quantity tends to decrease in four corner regions of a panel and therefore the four corner regions tend to be noticeably dark relatively when compared to a region of the panel other than the four corner regions.

In view of the foregoing, the frontside panel chassis 32 has vents 321a at the respective four corners thereof in the present embodiment. In the above configuration, light passing through the diffusion plate 22 toward the four corner regions of the liquid crystal panel 1 reaches the four corner regions thereof without being blocked by the frontside panel chassis 32 (see FIG. 5). While on the other hand, the circumferential walls 321 of the frontside panel chassis 32 are located at a peripheral region of the liquid crystal panel 1 except the four corner regions of the liquid crystal panel 1. In the above configuration, part of light passing toward the peripheral region of the liquid crystal panel 1 is blocked by the circumferential walls 321 (see FIG. 4).

That is, the light quantity of light reaching the four corner regions of the liquid crystal panel 1 increases relatively in the first embodiment when compared to a configuration without the vents 321a. Accordingly, reduction in light quantity around the four corners of the liquid crystal panel 1 can be prevented to increase degree of evenness of luminance distribution over the surface of the liquid crystal panel 1.

Figure 6:
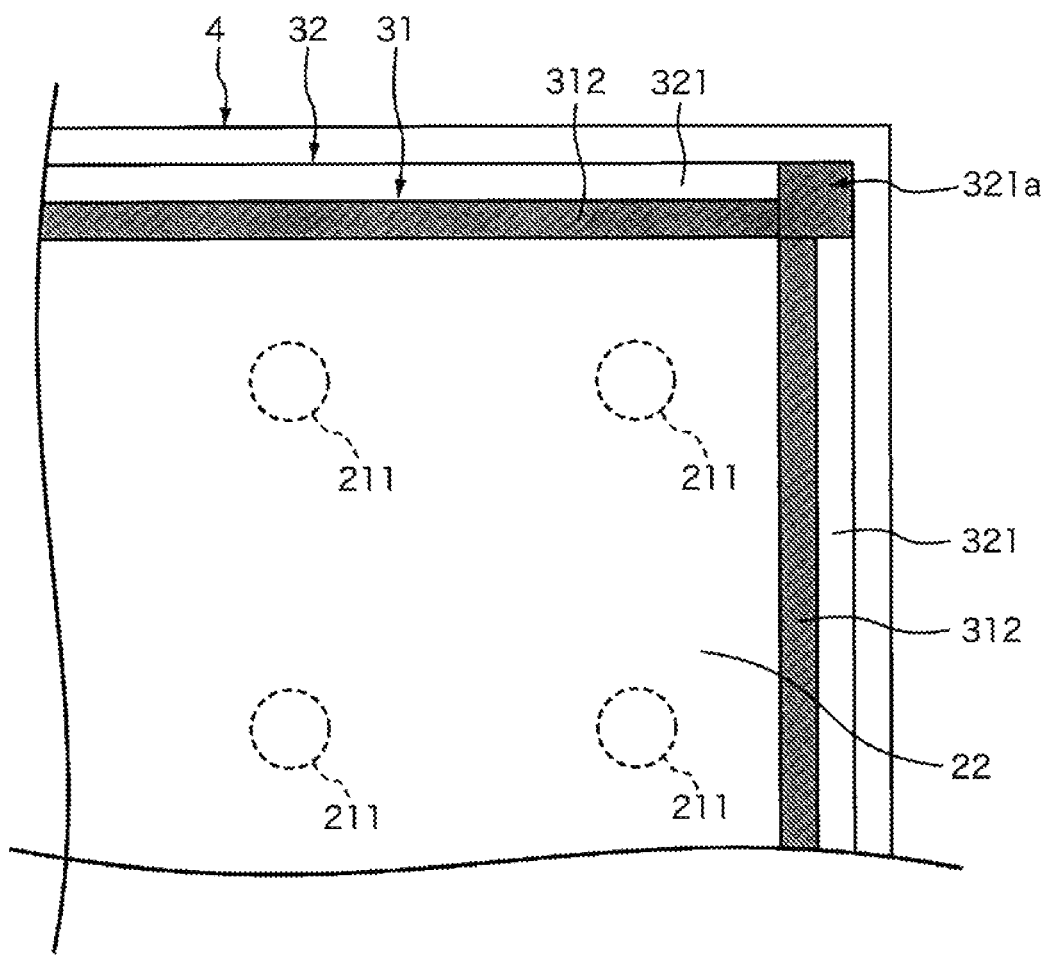
FIG. 6 is a diagram illustrating a variation of a vent in the first embodiment.

Note that the size of the vents 321a can be determined as appropriate for example according to a width of the frame portion 41 or distances from the four corners of the liquid crystal panel 1 to the LED chips. FIG. 6 is a diagram illustrating a variation of the vents 321a in the first embodiment. Likewise in FIG. 3, the liquid crystal panel 1 and the optical sheet 23 are omitted and a region indicating the backside panel chassis 31 is grayed in the partial front view of FIG. 6 in order to clarify a positional relationship between the backside panel chassis 31 and the frontside panel chassis 32.

In the example illustrated in FIG. 6, one of the vents 321a that are removed parts at the four corners of the frontside panel chassis 32 is illustrated. The illustrated vent 321a is in a rectangular shape when viewed from the front having a size substantially equal to the thickness of each side wall 312 (thickness of the side wall 312 at the bottom thereof).

As a result of the size of the vent 321a illustrated in FIG. 6 being larger than that 321a illustrated in FIG. 3, the light quantity of light reaching the four corner regions of the liquid crystal panel 1 can be increased. That is, because the light quantity at the four corner regions of the liquid crystal panel 1 varies depending on the size of the vents 321a, it is preferable to determine the size of the vents 321a as appropriate so that luminance distribution over the surface of the liquid crystal panel 1 is even out.

As described above, the frontside panel chassis 32 has the vents 321a at the respective four corners thereof in the first embodiment. In the above configuration, the light quantity of light reaching the four corner regions of the liquid crystal panel 1 can be increased to prevent reduction in light quantity in the four corner regions. Thus, degree of evenness of luminance distribution over the surface of the liquid crystal panel 1 can be increased.

In particular, even in a display apparatus having a narrow frame that cannot sufficiently cover the peripheral part of a panel, evenness of luminance distribution over effective display surface can be ensured. Moreover, even in a multi-display apparatus in which a plurality of the display apparatuses according to the present embodiment are arranged side by side, dark portions at respective four corner regions of adjacent display apparatuses may be made inconspicuous.

Second Embodiment

The vents 321a that are entirely-removed parts of the four corners of the frontside panel chassis 32 are described in the first embodiment. However, portions of the four corners of the frontside panel chassis 32 may be left partially.

In a second embodiment, a configuration of vents will be described that are parts of the respective four corners of the frontside panel chassis 32 that are partially removed so as to partially leave a portion of each of four corners. Note that an overall configuration of the display apparatus in the second embodiment is the same as that in the first embodiment and therefore description thereof is omitted.

Figure 7:
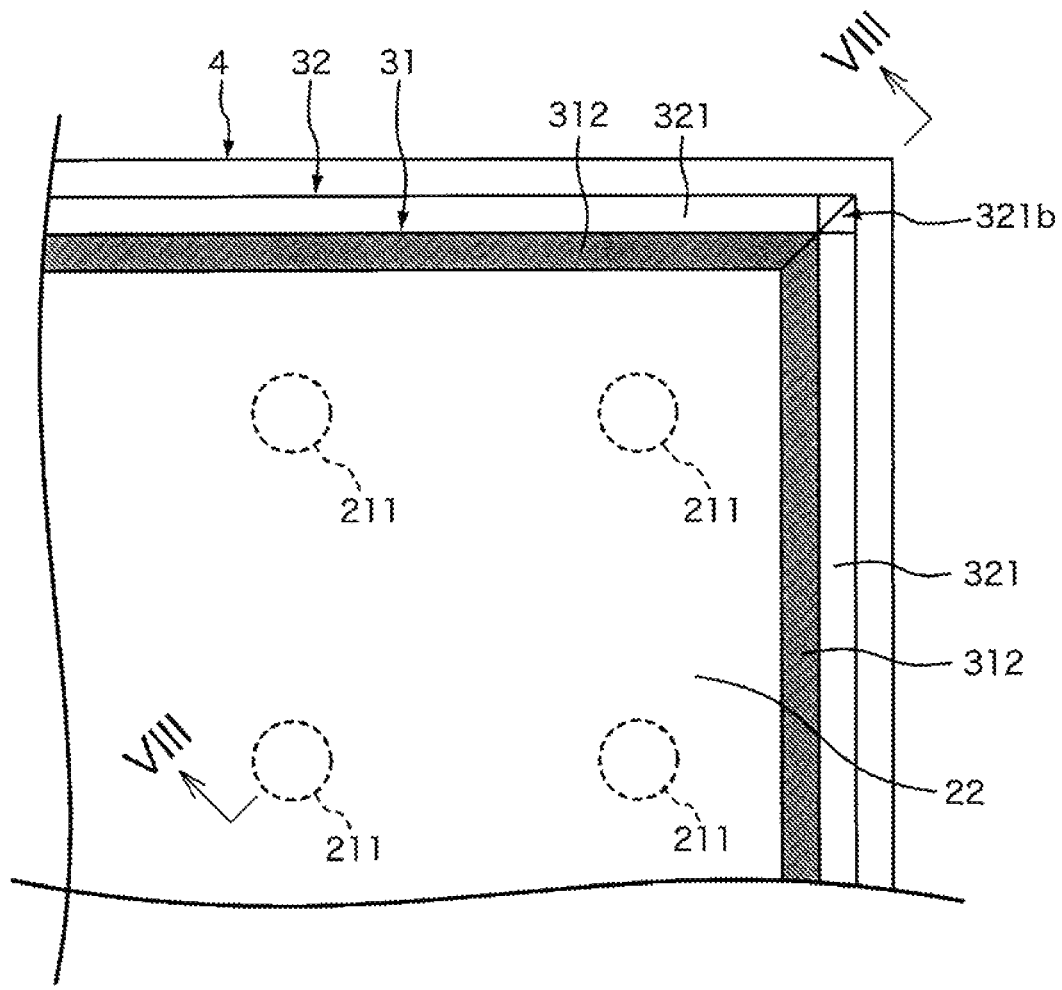
FIG. 7 is a partial front view of a display apparatus according to a second embodiment.
Figure 8:
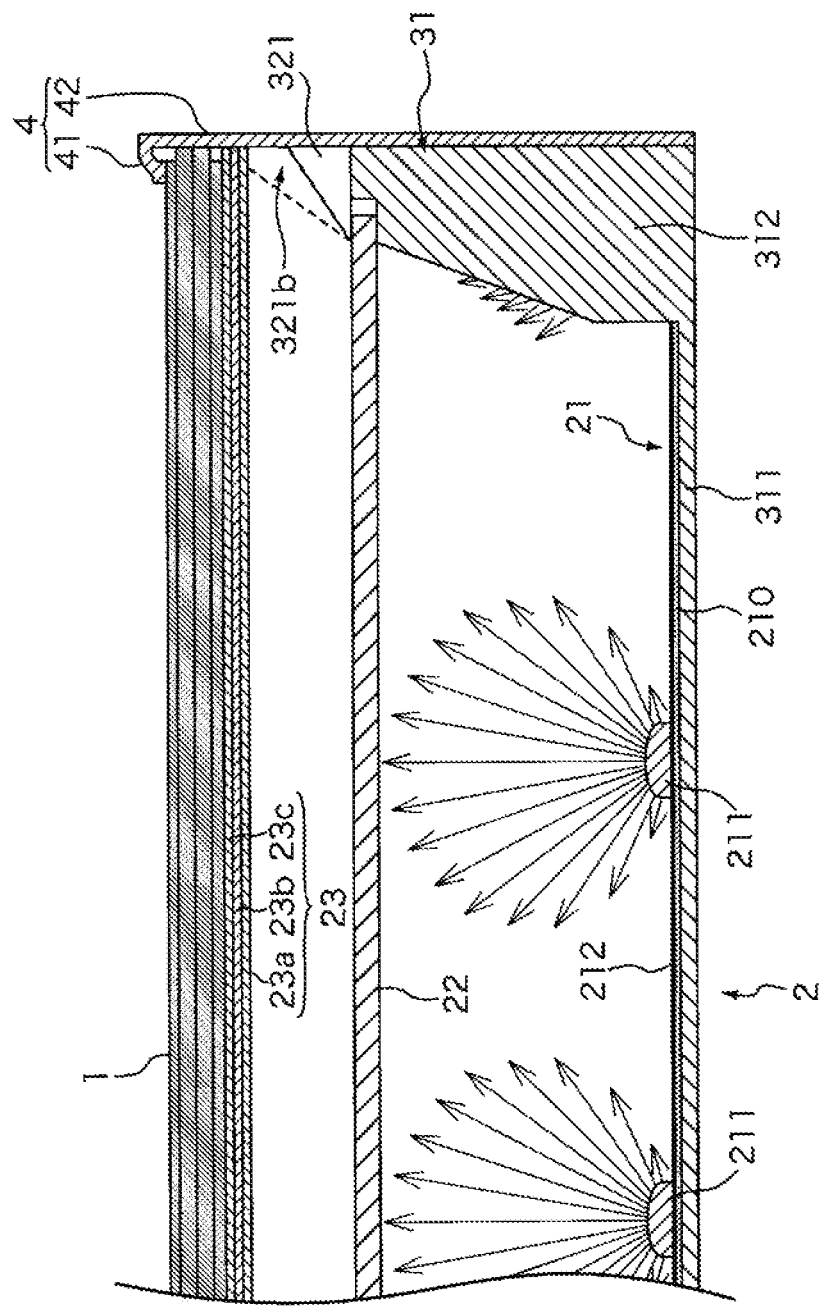
FIG. 8 is a cross-sectional view taken along a line VIII-VIII in FIG. 7.

FIG. 7 is a partial front view of the display apparatus according to the second embodiment. FIG. 8 is a cross-sectional view taken along VIII-VIII in FIG. 7. Note that the liquid crystal panel 1 and the optical sheet 23 are omitted and a region indicating the backside panel chassis 31 is grayed in the partial front view of FIG. 7 in order to clarify a positional relationship between the backside panel chassis 31 and the frontside panel chassis 32.

Vents 321b are provided in the second embodiment that are partially-removed parts of the respective four corners of the frontside panel chassis 32. The vents 321b each serve as a light passing portion through which light having passed through the diffusion plate 22 is allowed to pass toward a corresponding one of the four corners of the liquid crystal panel 1 in the second embodiment. In the example illustrated in FIGS. 7 and 8, one of the vents 321b at the respective four corners of the frontside panel chassis 32 is illustrated. The vents 321b as illustrated in FIGS. 7 and 8 are upper parts (parts close to the liquid crystal panel 1) of the respective four corners of the frontside panel chassis 32 that are each removed into a tetragonal shape when viewed from the front having a size substantially equal to the thickness of each circumferential wall 321 at the bottoms of the circumferential wall 321.

The light quantity of light reaching the four corner regions of the liquid crystal panel 1 increases relatively also in the second embodiment when compared to a configuration without the vents 321b. Accordingly, reduction in light quantity around the four corners of the liquid crystal panel 1 can be prevented to increase degree of evenness of luminance distribution over the surface of the liquid crystal panel 1.

Third Embodiment

Description will be made about a third embodiment in which vents having another shape are formed at the respective four corners of the frontside panel chassis 32.

Note that an overall configuration of the display apparatus in the third embodiment is the same as that in the first embodiment and therefore description thereof is omitted.

Figure 9:
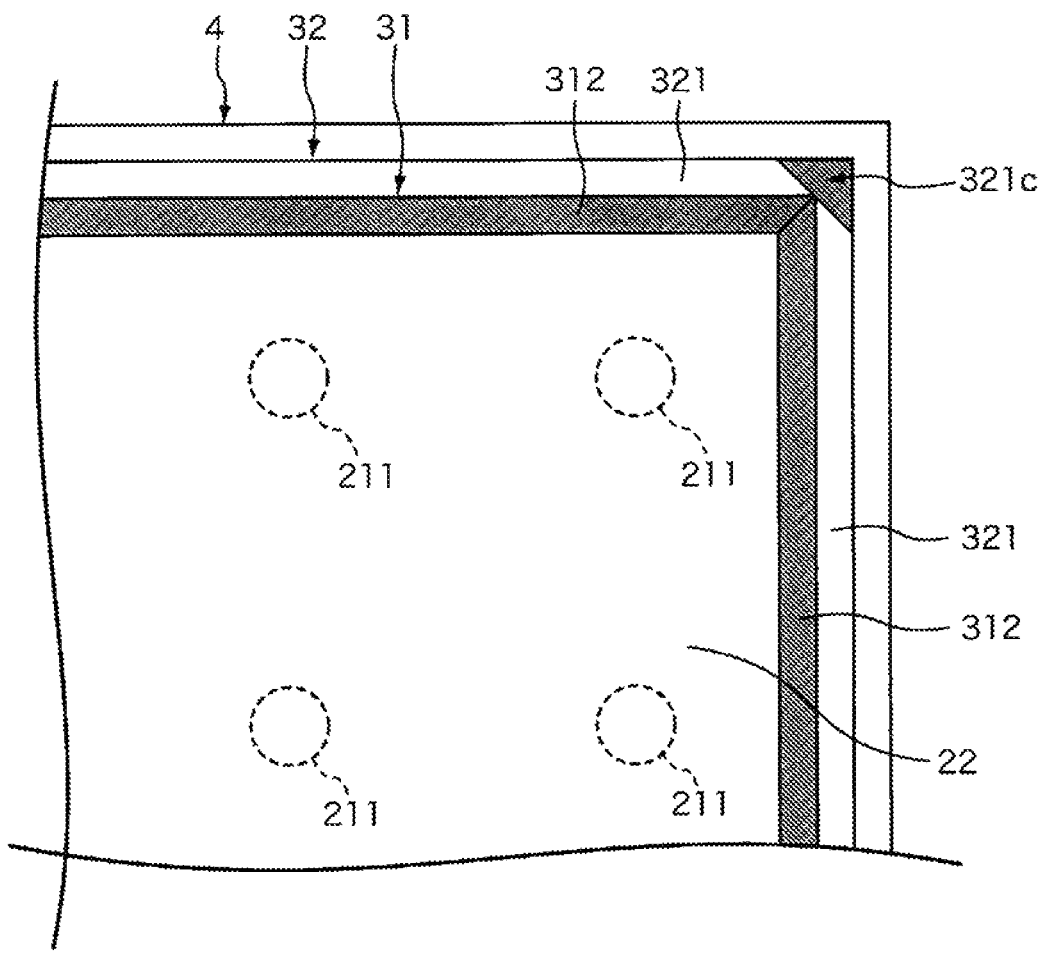
FIG. 9 is a partial front view of a display apparatus according to a third embodiment.

FIG. 9 is a partial front view of the display apparatus according to the third embodiment. Note that the liquid crystal panel 1 and the optical sheet 23 are omitted and a region indicating a backside panel chassis 31 is grayed in the partial front view of FIG. 9 in order to clarify a positional relationship between the backside panel chassis 31 and the frontside panel chassis 32.

Vents 321c are provided in the third embodiment that are removed parts of the respective four corners of the frontside panel chassis 32. The vents 321c each serve as a light passing portion through which light having passed through the diffusion plate 22 is allowed to pass toward a corresponding one of the four corners of the liquid crystal panel 1 in the third embodiment. In the example illustrated in FIG. 9, one of the vents 321c that are parts of the respective four corners of the frontside panel chassis 32 that are each remove into a triangular shape having a right-angled apex when viewed from the front is illustrated.

The light quantity of light reaching the four corner regions of the liquid crystal panel 1 increases relatively also in the third embodiment when compared to a configuration without the vents 321c. Accordingly, reduction in light quantity around the four corners of the liquid crystal panel 1 can be prevented to increase degree of evenness of luminance distribution over the surface of the liquid crystal panel 1.

Figure 10:
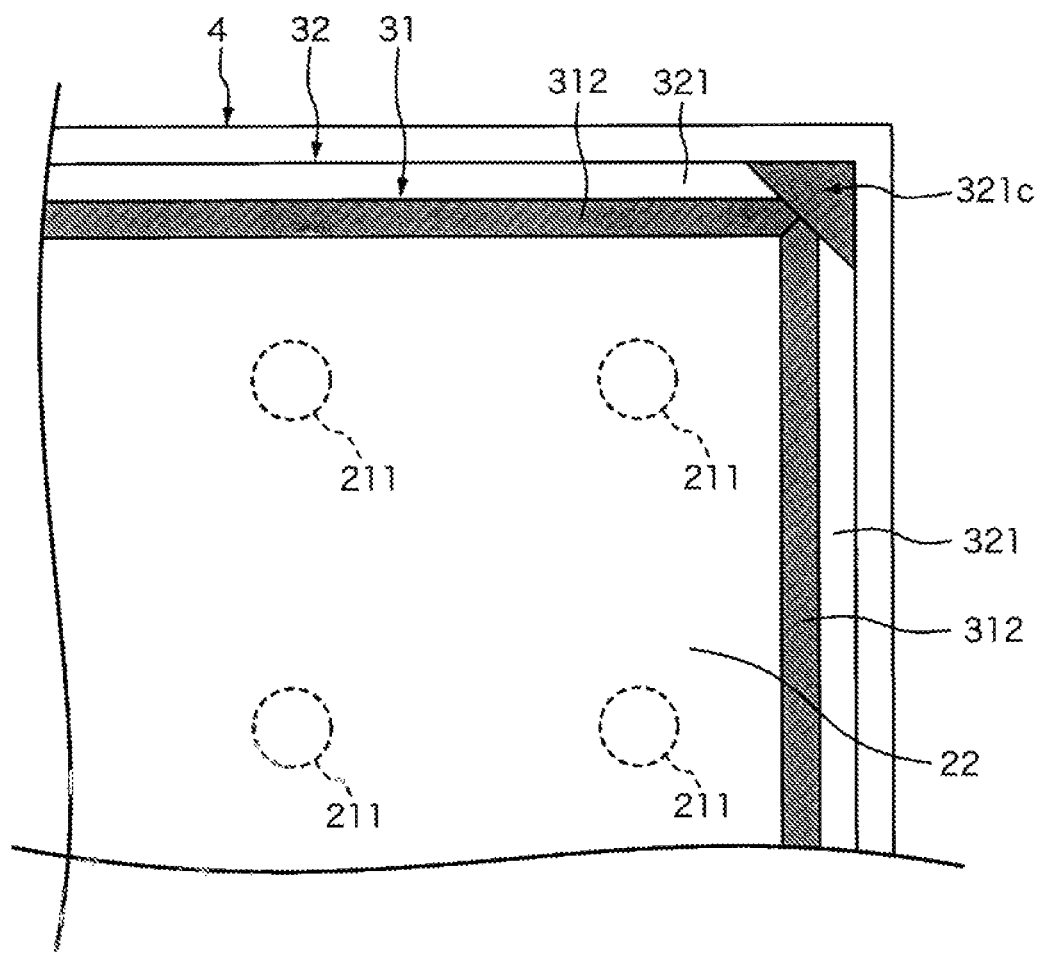
FIG. 10 is a diagram illustrating a variation of a vent in the third embodiment.

Note that the size of the vents 321c can be determined as appropriate for example according to a width of the frame portion 41 or distances from the four corners of the liquid crystal panel 1 to the LED chips. FIG. 10 is a diagram illustrating a variation of the vents 321c in the third embodiment. Likewise in FIG. 9, the liquid crystal panel 1 and the optical sheet 23 are omitted and a region indicating the backside panel chassis 31 is grayed in the partial front view of FIG. 10 in order to clarify a positional relationship between the backside panel chassis 31 and the frontside panel chassis 32.

In the example illustrated in FIG. 10, the vents 321c are parts of the respective four corners of the frontside panel chassis 32 that are each removed into a triangular shape having sides longer than those illustrated in FIG. 9 when viewed from the front.

In a configuration with the vents 321c as illustrated in FIG. 10, which are larger in size than those 321c illustrated in FIG. 9, the light quantity of light reaching to the four corner regions of the liquid crystal panel 1 can be increased. That is, because the light quantity at the four corner regions of the liquid crystal panel 1 varies depending on the size of the vents 321c, it is preferable to determine the size of the vents 321c as appropriate so that luminance distribution over the surface of the liquid crystal panel 1 is even out.

Fourth Embodiment

Description will be made about a fourth embodiment in which vents having another shape are formed in the respective four corners of the frontside panel chassis 32.

Note that an overall configuration of the display apparatus in the fourth embodiment is the same as that in the first embodiment and therefore description thereof is omitted.

Figure 11:
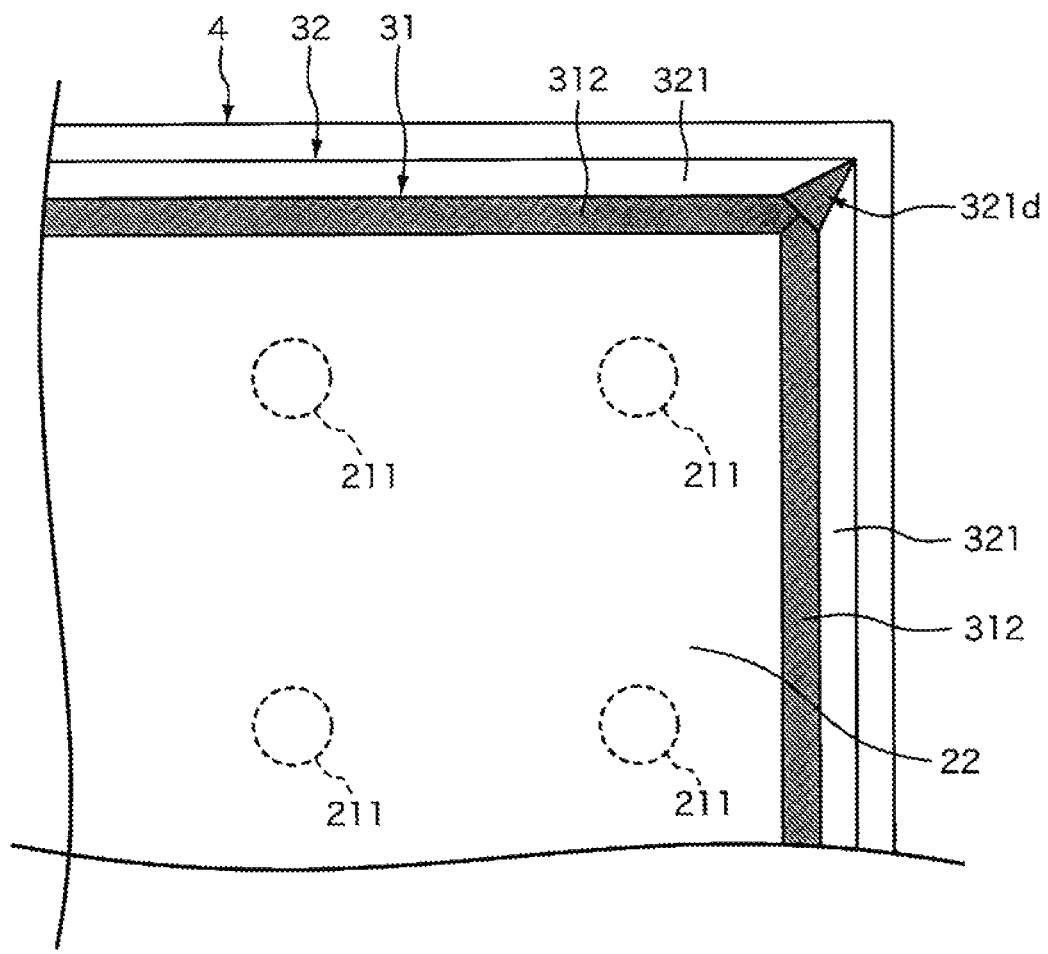
FIG. 11 is a partial front view of a display apparatus according to a fourth embodiment.

FIG. 11 is a partial front view of the display apparatus according to the fourth embodiment. Note that the liquid crystal panel 1 and the optical sheet 23 are omitted and a region indicating the backside panel chassis 31 is grayed in the partial front view of FIG. 11 in order to clarify a positional relationship between the backside panel chassis 31 and the frontside panel chassis 32.

Vents 321d are provided in the fourth embodiment that are removed parts of the respective four corners of the frontside panel chassis 32. The vents 321d each serve as a light passing portion through which light having passed through the diffusion plate 22 is allowed to pass toward a corresponding one of the four corners of the liquid crystal panel 1 in the fourth embodiment. In the example illustrated in FIG. 11, the vents 321d are parts of the respective four corners of the frontside panel chassis 32 that are each removed into a triangular shape having an acute apex when viewed from the front.

The light quantity of light reaching the four corner regions of the liquid crystal panel 1 increases relatively also in the fourth embodiment when compared to a configuration without the vents 321d. Accordingly, reduction in light quantity around the four corners of the liquid crystal panel 1 can be prevented to increase degree of evenness of luminance distribution over the surface of the liquid crystal panel 1.

The embodiments disclosed herein are mere examples in all aspects and should not be taken as any limitation. The scope of the present invention is presented in appended claims rather than the above description, and meaning equivalent to the scope of claims and any variations within the scope are intended to be encompassed. Any combinations of technical features described in respective embodiments are possible.

REFERENCE SIGNS LIST 1 liquid crystal panel
2 light source section
3 panel chassis
4 bezel
21 LED substrate
22 diffusion plate
23 optical sheet
31 backside panel chassis
32 frontside panel chassis
211 LED chip
212 reflection sheet
321a to 321d vent

The invention claimed is:
1. A display apparatus comprising:
a display panel;
a substrate facing the display panel and on which a light source is mounted;
a diffusion plate having a tetragonal shape and disposed between the display panel and the substrate;
a support portion that supports a peripheral part of the diffusion plate; and
a light passing portion that is provided at a corner of the support portion and through which light emitted from the light source passes, wherein
the support portion includes:
a first support member that supports the diffusion plate from a substrate side; and
a second support member that supports the diffusion plate from a display panel side, and
the second support member has an inner circumferential surface that reflects, of light traveling toward the peripheral part of the diffusion plate, light emitted from the light source toward a front side of the display apparatus without passing through the light passing portion.
2. The display apparatus according to claim 1, wherein the light passing portion has a vent created by removing, from a corner of the support portion, an entire region or a partial region of the corner.
3. The display apparatus according to claim 2, wherein the vent has a tetragonal or triangular shape when viewed from front.

4. The display apparatus according to claim 2, wherein the vent has a triangular shape having a right-angled apex when viewed from the front.

5. The display apparatus according to claim 2, wherein the vent has a triangular shape having an acute apex when viewed from the front.

6. The display apparatus according to claim 1, wherein the diffusion plate is disposed between the first support member and the second support member.

7. The display apparatus according to claim 1, wherein the light passing portion serves as an opening in the support portion.

8. The display apparatus according to claim 1, wherein the support portion accommodates the substrate.

9. The display apparatus according to claim 1, wherein the light passing portion is provided at a corner of the second support member.

10. The display apparatus according to claim 1, wherein the second support member is divided into plural parts by the light passing portion.

11. The display apparatus according to claim 1, wherein the first support member accommodates the substrate, and the second support member is in contact with the first support member and the diffusion plate.

12. The display apparatus according to claim 1, wherein the first support member includes a bottom surface portion and a side wall,
the side wall has an inclined surface that is an inner circumferential surface inclining obliquely outward between the bottom surface portion and the diffusion plate.

13. The display apparatus according to claim 1, wherein the first support member includes a bottom surface portion and a side wall, and
the side wall of the first support member has an inner circumferential surface that is located inward of an inner circumferential surface of the second support member.

14. The display apparatus according to claim 1, further comprising
an optical sheet located between the diffusion plate and the display panel and disposed on the second support member, wherein
the second support member has an inner circumferential surface inclining obliquely outward between the diffusion plate and the optical sheet.

15. The display apparatus according to claim 1, further comprising
a bezel that covers a peripheral part of the display panel.

16. The display apparatus according to claim 15, wherein the bezel includes:
a frame portion that covers the peripheral part of the display panel; and
a side wall that covers an outer circumferential surface of the support portion.

17. The display apparatus according to claim 16, wherein the frame portion of the bezel is in contact with the peripheral part of the display panel.

18. The display apparatus according to claim 16, wherein the side wall of the bezel has an inner circumferential surface that is in contact with the outer circumferential surface of the support portion.

* * * * *